United States Patent
Sunavala et al.

(10) Patent No.: US 9,979,639 B2
(45) Date of Patent: May 22, 2018

(54) SINGLE NETWORK INTERFACE FOR MULTIPLE INTERFACE VIRTUAL NETWORK FUNCTIONS

(71) Applicant: Futurewei Technologies, Inc., Plano, TX (US)

(72) Inventors: Farhad P. Sunavala, San Ramon, CA (US); Mark Xiang-Quan Huang, San Jose, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 212 days.

(21) Appl. No.: 14/811,683

(22) Filed: Jul. 28, 2015

(65) Prior Publication Data

US 2017/0034050 A1    Feb. 2, 2017

(51) Int. Cl.
*H04L 12/713* (2013.01)
*H04L 12/741* (2013.01)
*H04L 12/931* (2013.01)

(52) U.S. Cl.
CPC ............ *H04L 45/586* (2013.01); *H04L 45/74* (2013.01); *H04L 49/70* (2013.01)

(58) Field of Classification Search
CPC ........ H04Q 11/0478; H04L 2012/5619; H04L 29/06
See application file for complete search history.

(56) References Cited

U.S. PATENT DOCUMENTS 8,700,811 B2    4/2014   Oshins et al.
9,426,095 B2 *   8/2016   Pandey .................. H04L 49/00
2010/0054260 A1    3/2010   Pandey et al.
2013/0272305 A1   10/2013   Lefebvre et al.
2015/0222480 A1 *   8/2015   Gan ...................... H04L 61/103
                                                                           709/222

FOREIGN PATENT DOCUMENTS

CN          102857475 A     1/2013

OTHER PUBLICATIONS

International Search Report dated Oct. 26, 2016 in International Patent Application No. PCT/CN2016/091923, 4 pages.
Openvswitch, "Production Quality, Multilayer Open Virtual Switch", Open vSwitch, Jun. 2015, http://openvswitch.org/.
Chiosi et al., "Network Functions Virtualisation (NFV), Network Operator Perspectives on Industry Progress", Network Functions Virtualisation—Update White Paper, Issue 1, Oct. 15-17, 2013.
Chiosi et al., "Network Functions Virtualisation (NFV), Network Operator Perspectives on Industry Progress", Network Functions Virtualisation—White Paper #3, Issue 1, Oct. 14-17, 2014.

* cited by examiner

*Primary Examiner* — Chandrahas B Patel
(74) *Attorney, Agent, or Firm* — Vierra Magen Marcus LLP

(57) ABSTRACT

A virtual network function includes network interface via a single client network interface coupled to a network functions infrastructure. The network interface is provided using a virtual network function abstraction layer in the form of an implementation of a virtual network function in a virtual machine nested within a second virtual machine having a virtual switch. Routing between any number of ports on the virtual network function and a single network interface is enabled by providing a virtual interface in the switch mapped to each network interface needed by the virtual network function. Data from a client network via the network interface for the infrastructure is routed to the proper virtual network function interface in the virtual switch.

17 Claims, 8 Drawing Sheets

SINGLE NETWORK INTERFACE FOR MULTIPLE INTERFACE VIRTUAL NETWORK FUNCTIONS

BACKGROUND

Network functions virtualization (NFV) adapts network node functions to a virtualized environment. Network Function (NF) is a building block within an operator's network infrastructure, which has well defined external interfaces and a well-defined functional behavior. A VNF (VNF) provides exactly the same functional behavior and interfaces as the equivalent Network Function, but is deployed in a virtualized environment. An orchestrator is software which operates, manages and automates a distributed NFV Infrastructure. The orchestrator has control and visibility of all VNFs running inside the NFV Infrastructure.

VNFs with multiple network interfaces are difficult to orchestrate due to orchestrator limitations. Some orchestrators, for example, do not allow a VNF with two network interfaces on the same subnet. Several network appliances available today utilize multiple network interfaces. These multiple interface appliances, when virtualized, may present difficulties in orchestration.

SUMMARY

The technology, briefly described, includes a method providing a network service in a processing system. The method includes creating a parent or first virtual machine which includes a virtual switch and a single data network interface for receiving and transmitting data. The first virtual machine includes a bidirectional data network interface which receives and transmits data. The first virtual switch also includes a first virtual data network interface and a second virtual data network interface. A second virtual machine is also created as nested in the first virtual machine and operates within the first virtual machine. The second virtual machine includes a virtual network function (VNF), a first VNF data interface and a second VNF data interface. Data is routed between bidirectional data network interface of the first virtual machine, the first virtual data network interface and second virtual data network interface so that inbound and outbound network data are routed to the virtual network function via the first VNF data interface and the second VNF data interface.

Also provided is a computer readable medium including code instructing a processor, the code includes code configured to create a first virtual machine and a first virtual switch in the first virtual machine. The code configures the first virtual switch to provide a data network interface which receives network data from and outputs network data to an infrastructure network interface. The first virtual switch is also configured to include a first virtual data network interface and a second virtual data network interface. Code is further provided to cause the processor to create a virtual network function operable within a second virtual machine where the second virtual machine is nested and operable within the first virtual machine. The virtual network function includes a first VNF data interface and a second VNF data interface, each which communicates with one or more of the first and second virtual data network interfaces. Also provided is code configured to route data flows between the data network interface of the first virtual switch, and the first virtual data network interface and second virtual data network interface. The code is operable to direct inbound and outbound network data flow between data on the infrastructure network interface and the virtual network function.

A service delivery network in accordance with the technology includes a processing system including at least a processor, storage operably coupled to the processor, and a network interface. The service delivery network includes a plurality of virtual network function systems in the processing system, each virtual network function including instructions operable to instruct the processor to create the virtual network function system coupled to the network interface, the instructions instruct the processor to create a first virtual machine, and provide a first virtual switch within the first virtual machine. The first virtual switch includes a single data network interface interfacing with the network interface and a first virtual data network interface and a second virtual data network interface. The instructions are operable to create a second virtual machine within the first virtual machine and a virtual network function operable in the second virtual machine. The virtual network function includes a first VNF data interface and a second VNF data interface. The instructions are operable to manage data flows between the single data network interface, the first virtual data network interface and second virtual data network interface where the data flows include inbound and outbound network data directed to the virtual network function.

DETAILED DESCRIPTION

Technology is presented which provides a VNF system. The system provides a VNF interface via a single data port coupled to an NFV infrastructure using a virtual network function abstraction layer, allowing any number of network interfaces required by a VNF to be addressable via a single network interface. As such, virtual network function requirements and orchestrator specific requirements are minimized, allowing relatively free selection of an orchestrator, VNF, and NFV infrastructure so that orchestration and creation of service chaining systems may be implemented by any of a number of different orchestrators.

Figure 1A:
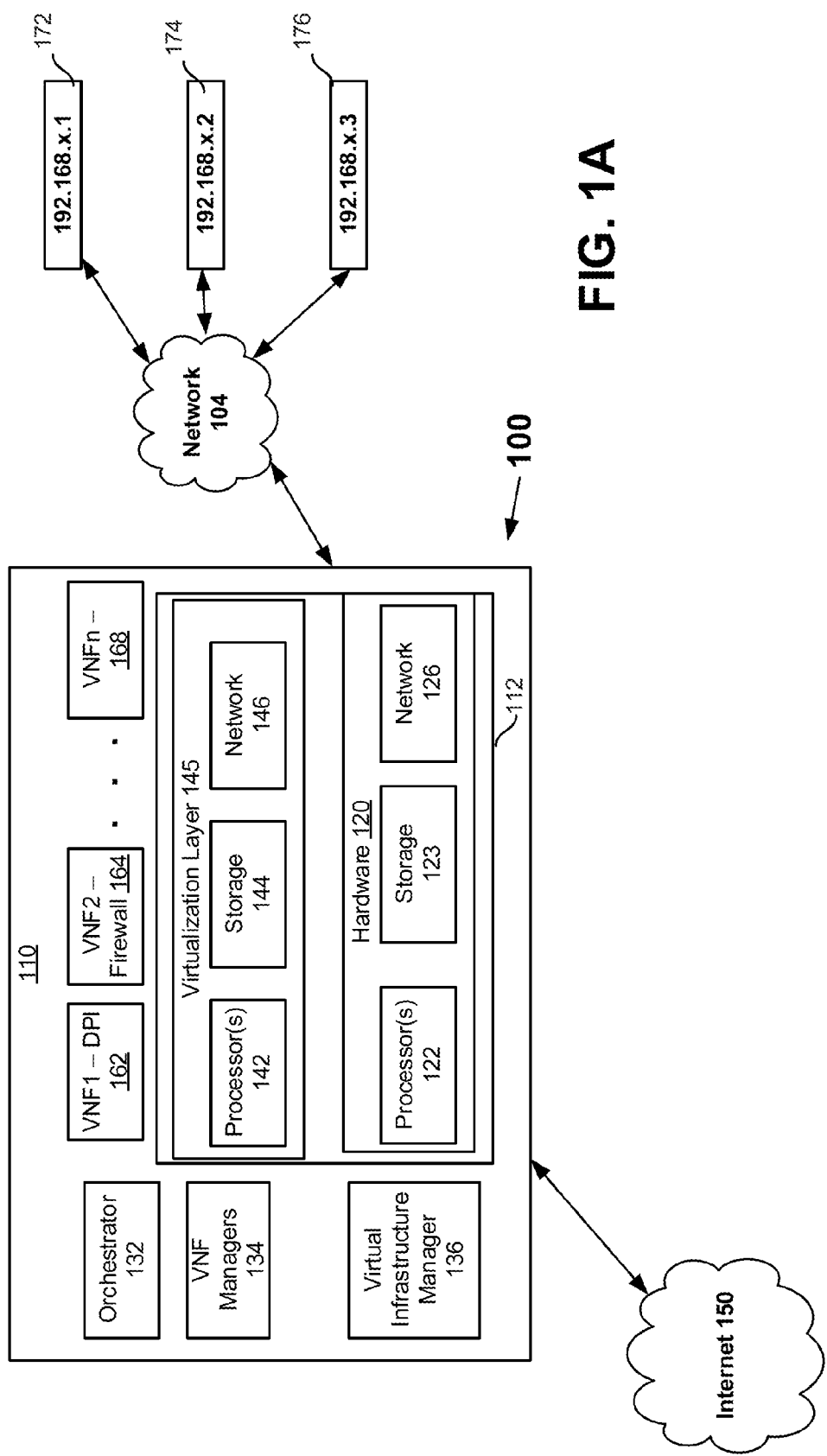
FIG. 1A is a block diagram illustrating a computing system environment architecture in which a VNF in accordance with the present technology may be utilized.
Figure 1B:
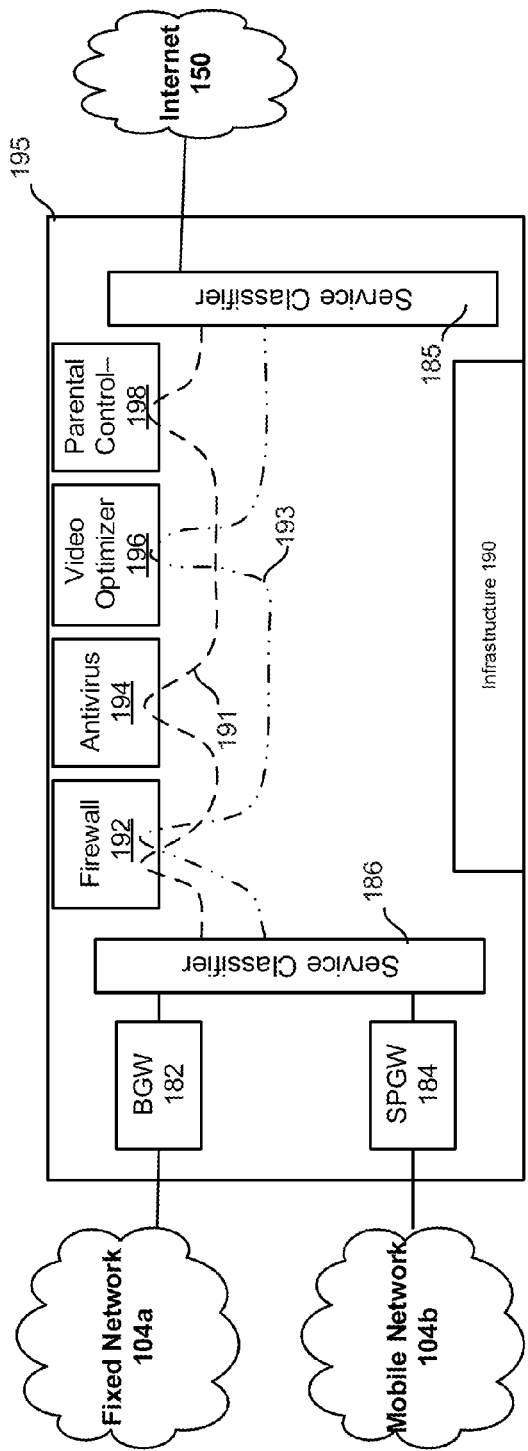
FIG. 1B is a block diagram of a service delivery network in which the present technology may be utilized.
Figure 1C:
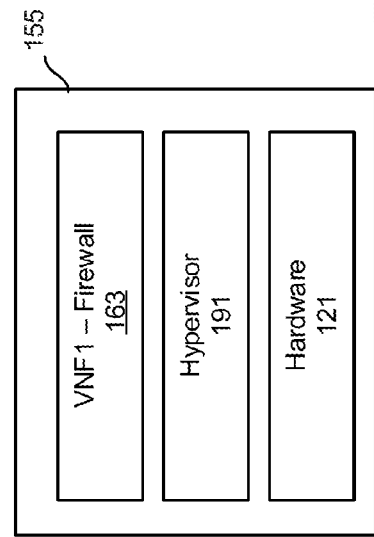
FIG. 1C is a block diagram of a localized VNF in a processing system.

The technology may be utilized in various computing system environments. FIGS. 1A-1C illustrate three computing system environments in which the technology may be utilized.

FIG. 1A illustrates a computing system environment 100 suitable for implementing the technology discussed herein. The computing system environment 100 may implement a service network 110, including a plurality of virtual network functions (VNF) 162, 164, 168, all implemented on a network function virtualization (NFV) infrastructure 112. The NFV infrastructure is the totality of hardware and software components which builds the environment in which VNFs are deployed, managed and executed, and may include one or more processors 122, storage 123, and networking interfaces 126. There are numerous configurations of an NFV infrastructure that may be utilized in a computing system environment 100. The infrastructure 112 shown in FIG. 1 is merely exemplary. The NFV infrastructure 112 includes a virtualization layer 145 which may include virtualized processors 142, virtualized storage 144 and virtualized network components 146. In addition, a VNF orchestrator 132, one or more VNF managers 134 and a virtual infrastructure manager 136 may be provided.

Each VNF 162, 164, 168 comprises a network function or service operating in a virtual machine instance or across virtual machine instances and which may be used in virtual or non-virtual networks. In the example of FIG. 1A, VNF 162 is shown as a deep packet inspector (DPI), VNF 164 is shown as a firewall, and VNFn 168 is any number of additional VNFs which may be utilized in a service delivery network.

VNFs virtualize network functions traditionally performed by specialized hardware devices. Examples of network functions include switches, routers, Home Location Registers (HLR), Serving Gateways (SGW), Packet Data Network Gateways (PGW), Residential Gateways (RGW), Broadband Remote Access Servers (BRAS), Carrier Grade Network Address Translators (CGNAT), devices for Deep Packet Inspection (DPI), Provider Edge (PE) Routers, Mobility Management Entities (MME), and Element Management Systems (EMS). Many commercial vendors provide products implementing VNFs. Each VNF 162, 164, 168 may be composed of multiple internal components Some VNFs are configured to use one network interface for their data path. Examples of such devices include rate limiters and TCP proxies. Other VNFs are configured to use multiple network interfaces, such as routers, firewalls and deep packet inspection devices. Still other VNFs specify how such devices may be configured relative to their interfaces. For example, a firewall may be configured to act in bridging mode. In bridging mode, two interfaces of the firewall are all connected to the same subnet. In such cases, it may be impermissible to connect each network interface of the firewall function to the same subnet and the firewall or the infrastructure (hypervisor) may disable one of more interfaces when it detects such a connection. Alternately, the infrastructure may not allow such a connection to be configured in the first place, and the firewall may disable one of the interfaces where it detects such a connection. In one example, a commercially available firewall device, when implemented in a VNF and operating in bridge mode, requires two interfaces to be in the same subnet. Similarly, the OpenWRT Home Router (www.openwrt.org) requires multiple interfaces in the same subnet. Such virtual appliances cannot be orchestrated currently with certain orchestrators available in the market.

Orchestrators have requirements as to the type of connections allowed within the virtual environment. VNFs with multiple network interfaces may be difficult to orchestrate due to orchestrator limitations. For example, the Openstack orchestrator (www.openstack.org) does not allow a VNF with two network interfaces on the same subnet. Several network appliances available today utilize multiple network interfaces (including, for example the above mentioned DeepEdge Firewall, and OpenWRT Home router and firewall). These appliances in the virtual form become difficult to orchestrate for service chaining (as described with respect to FIG. 1B). Even in cases when orchestration is possible, these virtual appliances utilize a variety of complex traffic flows when used in a service chain.

The virtualization layer 145 abstracts hardware resources and decouples the VNF software from the underlying hardware 120, ensuring the hardware independent lifecycle for the VNF's. The virtualization layer 145 is responsible for abstracting and logically petitioning physical resources, enabling the software that implements the VNF to use the underlying hardware 120, and providing virtualized resources (virtualized processors 142, virtualized storage 144 and virtualized network components 146) to the VNF. Typically, this functionality is provided for computing and storage resources in the form of a hypervisor governing one or more virtual machines.

Each VNF is deployed in a virtual machine, although a VNF can be deployed over multiple virtual machines where each virtual machine hosts a single component of the VNF. In other cases, the whole VNF can be deployed in a single VM. FIG. 1 illustrates an example where each VNF is contained within a single virtual machine. The use of hypervisor is one of the present typical solution for deployment a virtualization layer for VNF's. In other cases, VNFs may run on non-virtual servers by means of an operating system or VNF's implemented is an application that can run virtualized infrastructure or on bare metal. As such, system 110 can be a system implemented across multiple hardware devices and across datacenters, or in a single computing system or in a router.

A virtualized infrastructure manager 136 comprises the functionalities that are used to control and manage interaction of a VNF with computing, storage and networking resources under its authority. Virtualized infrastructure manager 136 may perform resource management in the charge of software inventory, computing, storage and network resources dedicated to the infrastructure, coordinate allocation of virtualization enablers, and manage of infrastructure resources and allocation.

The orchestrator 132 is in charge orchestration management of the infrastructure and software resources and realizing network resources on the infrastructure. VNF managers 134 are responsible for the functions such as lifecycle management, lifecycle extent, instantiation, update, query, scaling, and termination. Multiple VNF managers may be deployed.

In the computing system environment 100 of FIG. 1, multiple client devices 172, 174, 176 may connect to the service network 110 via a network 104. Client devices 172, 174, 176 may include, for example, any combination of any type of computing device including a personal computing system, a notebook computer, a desktop computer, a mobile computing device such as a tablet or mobile phone, a server, or any network enabled computing device. The network 104 may comprise a public or private network coupled to the service device network. The service network 110 may provide any number of VNFs to the client devices 172-176, including the routing of client traffic to and from the other public or private networks, such as the Internet 150. In this example, traffic to and from Internet 150 is serviced by one or more VNFs under the control of a service classifier.

FIG. 1B illustrates the concept of service function chaining in a service delivery network 195. Illustrated in FIG. 1B are a first network 104a and a second network 104b. Network 104a may have any number of client computing devices (not shown) connected to the network 104a. Network 104a is coupled to the service delivery network through a broadband network gateway (BGW) 182. Similarly, mobile network 104b is connected to the service delivery network 195 via a service provider gateway (SPGW) 184. Traffic from the broadband network gateway 182 may be directed by service classifiers 185 and 186 through any one of four illustrated VNFs 192, 194, 196, 198. Each of the elements within the service delivery network 195 may be coupled by one or more internal networks. Typically at least a data network and a management network are provided between the VNFs and other elements in the service delivery network 195. The data network and management network are supported by infrastructure 190 which may comprise the NFV infrastructure, (the hardware and software components supporting the VNFs). Any number of VNFs may be implemented in a service delivery network 195. The VNF illustrated in FIG. 1B include firewall 192, antivirus 194, video optimizer 196, and parental control 198.

Traffic from different external networks (104a, 104b) and/or different devices on the external networks may be directed to specific services or sequences of services in the VNFs as illustrated in FIG. 1B. In the example shown in FIG. 1B, traffic 191 to and from network 104a is directed to firewall VNF 192, antivirus VNF 194 and parental control VNF 198. Traffic 193 to and from the network 104b is directed by the service classifiers 185, 186 to firewall VNF 192 and video optimizer VNF 196.

While the technology finds applicability in large scale virtualized systems, the technology may be applied to small scale systems as well. FIG. 1C illustrates a VNF 163 implemented in a single hardware device 155. The hardware device 155 may include hardware 121 (including sufficient hardware infrastructure such as a processor, storage and networking components, not shown) sufficient to support a virtualization layer in the form of a hypervisor 191 and a firewall VNF 163 may be created in the hardware device. An exemplary implementation of VNF 163 may comprise the OpenWRT router. OpenWRT can run on various types of devices. As such, hardware 121 may include router appliances, residential gateway appliances, smartphones, pocket computers, and laptops as well as computers based on the x86 architecture.

Figure 2:
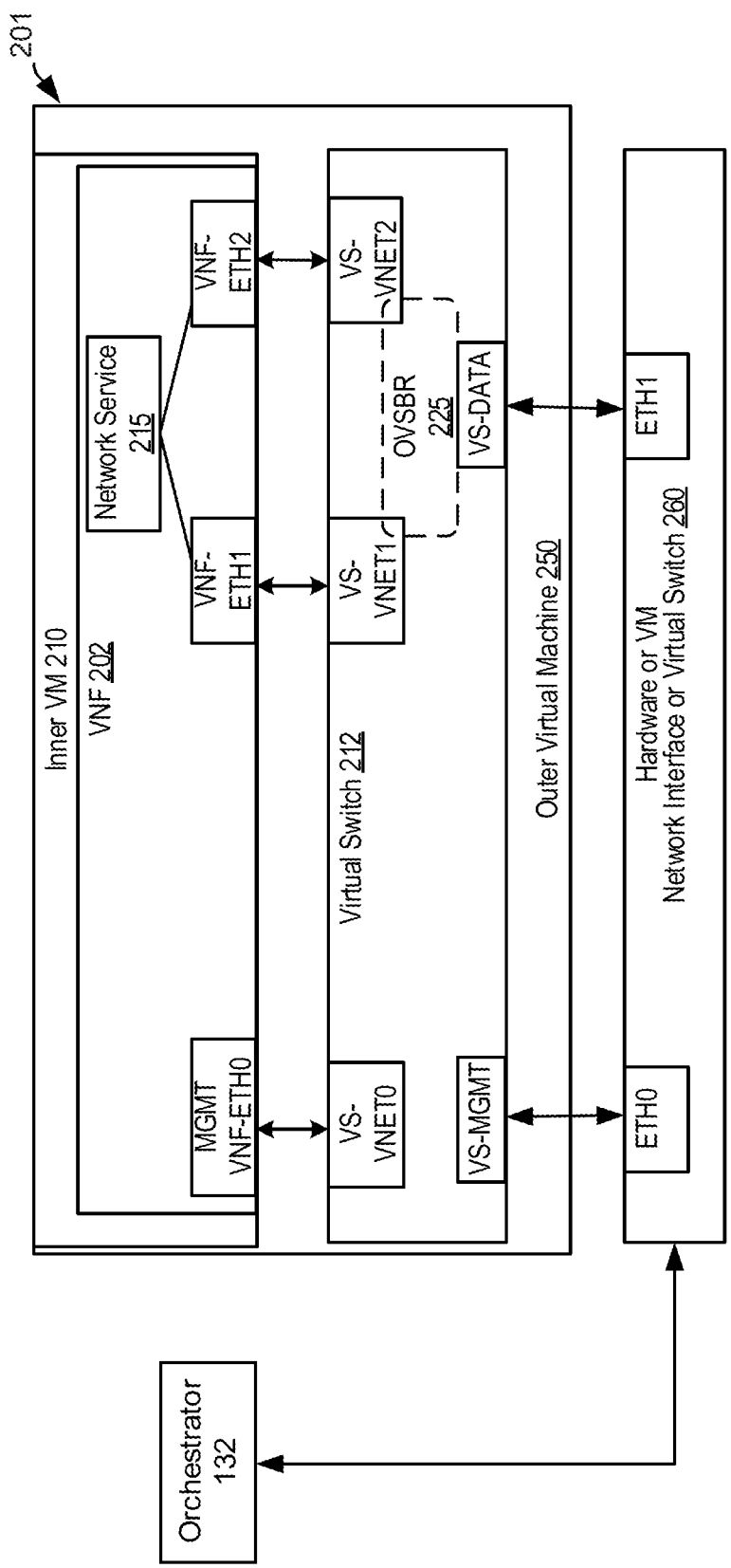
FIG. 2 is a block diagram illustrating a virtual machine architecture implementing a single network interface for a multiple network interface VNF device.

FIG. 2 illustrates an embodiment of the present technology for implementing single or multi-interface VNFs using a single network interface. In the illustration of FIG. 2, VNF 202 is created within a first or inner virtual machine 210. The first or inner virtual machine 210 is nested within a second or outer virtual machine 250. The outer virtual machine 250 further includes a virtual switch 212 which is utilized to route data flows between virtual data network interfaces VS-VNET1 and VS-VNET2 in the virtual switch 212 and the inner virtual machine 210. The inner virtual machine 210 and outer virtual machine 212 may be created by any number of different operating environments. The result is a VNF system 201 which provides a single data network interface (VS-DATA) for any VNF needing one or more network interfaces (VNF-ETH1, VNF-ETH2), allowing such VNFs to work with a wide variety of orchestrators and independently of any requirements of the orchestrator or the VNF.

An exemplary operating environment for creating the virtual machines including outer virtual machine 250 is OpenStack (noted above), an open-source cloud computing software platform. The virtual switch 212 may comprise any number of different publically available virtual switch software components. An example of a virtual switch is Open vSwitch (www.openvswitch.org), which is available as a programmatic extension for a cloud computing software platform such as OpenStack. It should be understood that alternative operating environments and alternative virtual switches may be utilized.

The outer virtual machine 250 acts as the interface to the infrastructure interface layer 260. The infrastructure interface layer 260 may comprise, for example, computing hardware, a virtual machine interface, and/or another virtual switch. In one embodiment, the interface layer comprises the virtualization layer 145 of FIG. 1A. In accordance with the technology, the VNF system 201 of FIG. 2 provides the single data network interface (in this example VS-DATA) for any type of VNF 202.

The VNF 202 includes a VNF management network interface VNF-ETH0, and two VNF network interfaces VNF-ETH1 and VNF-ETH2. In the example of FIG. 2, while two VNF data network interfaces are shown, the technology is not limited to use with VNFs using two VNF network interfaces and may have applications in conjunction with VNFs having one or more VNF network interfaces. The VNF 202 may comprise a VNF from, for example, a commercial or other public supplier which is configured to use to virtual function network interfaces VNF-ETH1 and VNF-ETH2. One example of a VNF 202 is a virtualized version of the TrendMicro DeepEdge firewall.

The VNF network interfaces VNF-ETH1 and VNF-ETH2 are coupled to a network service component 215. In one example, a network service component 215 which might utilize two VNF network interfaces VNF-ETH1 and VNF-ETH2 to provide a firewall function. In other examples, the network service component 215 may comprise any type of network appliance service which may be virtualized in a VNF.

The multiple network interfaces of the inner VM 202 are attached to the virtual switch 212 with multiple VNF network interfaces VNF-ETH1 and VNF-ETH2 for a data path nested within outer virtual machine 250 with a single network interface VS-DATA for the data path to the infrastructure interface layer 260.

The outer virtual machine 250 includes a virtual switch 212 which is configurable to provide any number of virtual network interfaces and provide programmable flows between the various network interfaces. Another type of virtual switch is the Cisco Application Virtual Switch (AVS). In the present example, implementation of flows in the virtual switch will be described with reference to in implementation using Open vSwitch, and those skilled in the art will recognize that alternative forms of flow control will utilize different implementations.

Virtual switch 212 is configured to provide a series of three virtual network interfaces VS-VNET0, VS-VNET1 and VS-VNET2 which interface with the VNF device 202. The virtual network interfaces include a management network interface VS-VNET0, and two data network interfaces VS-VNET1 and VS-VNET2. Data network interface VS-VNET1 communicates with VNF network interface VNF-ETH1 on the VNF and data network interface VS-VNET2 is configured to communicate with VNF-ETH2 in the VNF. The illustrated communication between VS-VNET1 to VNF-ETH1 and VS-VNET1 and VNF-ETH2 is exemplary and communication may take place between any virtual network interface of switch 212 and any VNF network interface of VNF 202. Virtual switch 212 also provides a management network interface VS-MGMT and a single, bidirectional virtual data network interface VS-DATA. Network interface VS-DATA becomes the single network interface through which the VNF 212 having multiple network interfaces may communicate with the infrastructure interface layer 260. Infrastructure interface layer 260 is configured to provide communication with the VNF212 via management network interface ETH0 and a data network interface ETH1.

Using flow control between the VS-DATA network interface, and VS-VNET1 and VS-VNET2 data interfaces, packets destined for the VNF-ETH1 and VNF-ETH2 network interfaces on the VNF are directed to the respective network interfaces within the virtual switch 212.

VNF-ETH0 and VS-VNET0 are internal interfaces for management and can be given pre-assigned IP addresses. VNF management interface VNF-ETH0 allows configuration instructions to be provided to the VNF 202. Configuration instructions may be routed through a separate management network or sub-net and via the management interfaces. Management data for a given VNF is directed through network interface ETH0 to a virtual switch management interface VS-MGMT, which directs management data to the VNF management interface VNF-ETH0 via virtual network interface VS-VNET0 in the virtual switch 212. In this example, network service component 215 may be a software bridge inside the TrendMicro DeepEdge virtual network function, or any other VNF service component having specific single or multi-interface needs.

In the outer VM 250, VS-DATA, VS-VNET1 and VS-VNET2 are assigned to a flow controller component within the virtual switch 212. In Open vSwitch, this may be implemented by assigning VS-DATA, VS-VNET1 and VS-VNET2 to a bridge, which on Open vSwitch may be called OVS Bridge 225 (OVSBR) in this implementation. Alternative flow controller components may be used in alternative virtual switch systems. When the outer virtual machine 250 is orchestrated, VS-MGMT and OVSBR 225 will be assigned DHCP addresses by the orchestrator 132. Through the VS-MGMT interface in the outer virtual machine 250, flows can be programmed in the virtual switch 212 such that the single, bidirectional VS-DATA interface can direct traffic coming into the virtual machine 250 to either VS-VNET1 or VS-VNET2. The flow classification can be based on source IP address, source MAC address, or other criteria. In a similar manner, flows can be programmed through the VS-MGMT interface such that the single VS-DATA interface can direct and modify traffic coming out of VS-VNET1 or VS-VNET2 correctly on VS-DATA. This flow classification can be based on the destination IP address, destination MAC address, or other criteria.

In one example, data flows from a tenant network (or subnet) may be directed to the internet and traffic from the internet directed to clients on the tenant network (or subnet). In such case, VS-ETH1 and VS-ETH2 can be considered ingress and egress interfaces, respectively, and the flows within the virtual switch 212 may be provided as follows:

Flow 1: all packets from VS-DATA network interface with network source address of tenant network, send to ingress network interface VS-VNET1-VNF-ETH1 (and to network service 210) e.g. a packet going from a client to internet goes to internet;

Flow 2: all packets from VS-DATA network interface with network destination address of tenant network and source address not equal to tenant network, send to egress network interface VS-VNET2-VNF-ETH2;

Flow 3: all packets from the egress VNF interface (VNF-ETH2) with network destination not equal to the tenant subnet, send to VS-DATA; and Flow 4: all packets from ingress network interface (VNF-ETH1) with network destination of tenant IP and source address not equal to tenant network, send to VS-DATA (and on to tenant network).

As such, the outer virtual machine in conjunction with the inner virtual machine provides a virtual network function abstraction layer, allowing any number of network interfaces required by a VNF to be addressable via a single network interface in the outer virtual machine. As such, virtual network function requirements are abstracted from the orchestrator and the virtual network infrastructure, and orchestration of service chaining systems may be implemented by any of a number of different orchestrators.

Figure 3:
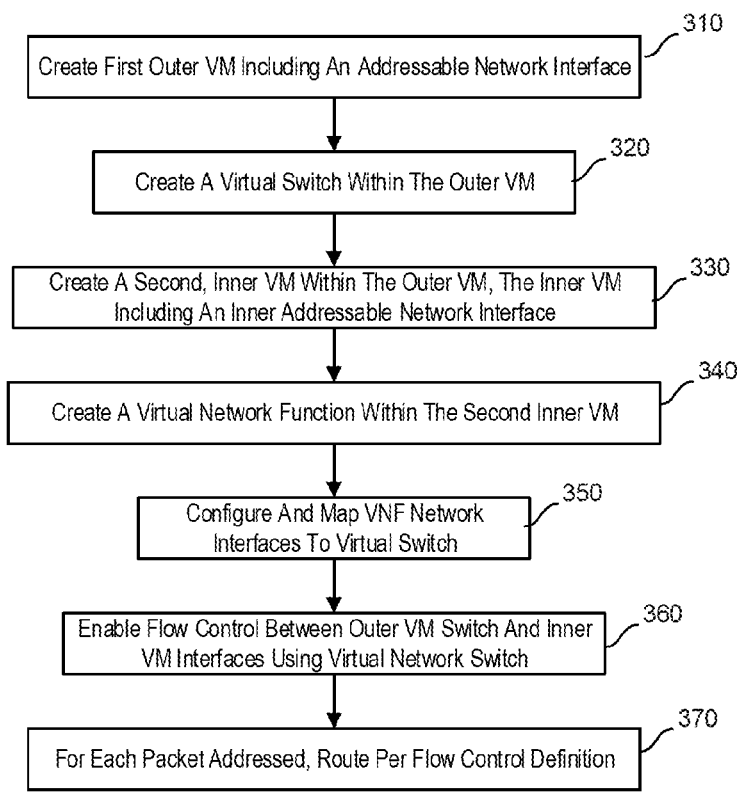
FIG. 3 is a method implemented by a processing device to provide a VNF requiring multiple network interfaces with a single network interface.

FIG. 3 illustrates a method in accordance with the present technology for creating the system of FIG. 2. The method of FIG. 2 may be implemented by code causing a computer to execute instructions in conjunction with the underlying components and commercially available software described herein.

At 310, an outer virtual machine including addressable network interface is created. In the above example of FIG. 2, the network interface is VS-DATA. The outer virtual machine may be formed on any suitable computing hardware and created using any number of commercially available virtual machine code bases, as described above. At 320, a virtual switch with in the outer virtual machine is instantiated. When using Open vSwitch, this may comprise configuring the internal routing between the respective interfaces outlined above with respect to FIG. 2. At 330, a second or inner virtual machine within the outer virtual machine is created. A host virtualization environment may be any hypervisor which provides a virtual machine in a virtualization environment to emulate resources of hardware. The system implements nested virtualization as it includes the inner virtual machine executed within a virtualization layer of the outer virtual machine. In this embodiment, virtual machine 212 is executed in virtualization layer 250 via a virtual machine at that level to provide virtualized resources corresponding to hardware.

At 340, a VNF within the inner virtual machine is created. As noted herein the VNF may include any number of network interfaces. In the example herein, the VNF includes two network interfaces which will be mapped to the inner virtual machine interface.

At 350 the virtual switch is configured to include as many number virtual interfaces for the VNF as used by the VNF, as well as a bidirectional virtual data interface (VS-DATA) and management interface (VS-MGMT) for the infrastructure interface layer 260. At 360, flow control between the outer VM switch and the virtual network interfaces is programmed in the virtual switch. Flow control can be created based on the different types of virtual network switches which one is utilizing. An example of the various flows for a two-interface VNF is illustrated in FIG. 4. At 370, for each packet received at the bidirectional data network interface, the packet is routed per the flow control definitions.

Figure 4A:
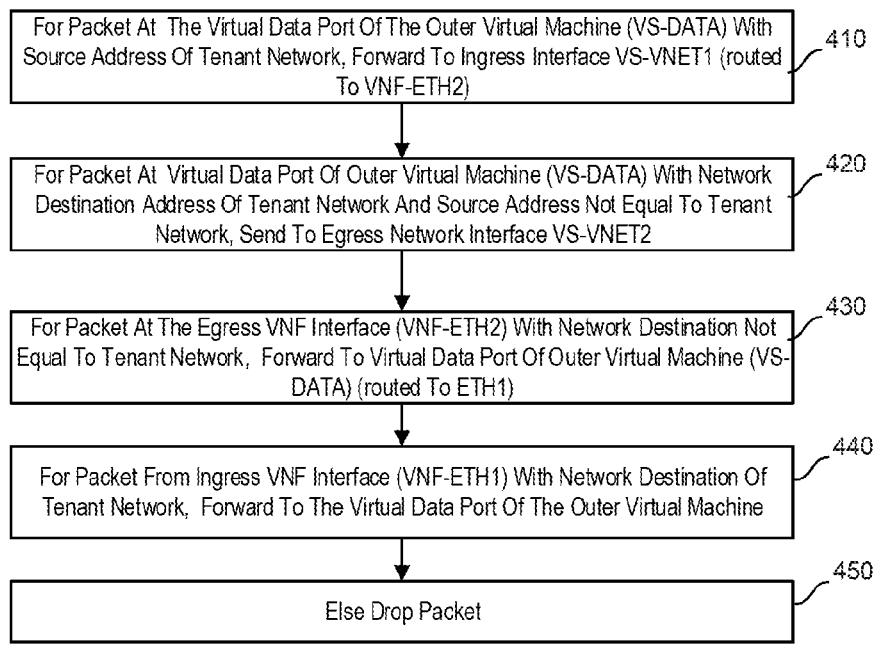
FIG. 4A is a method implemented by a processing device for routing data flow in a virtual switch in a virtual machine.
Figure 4B:
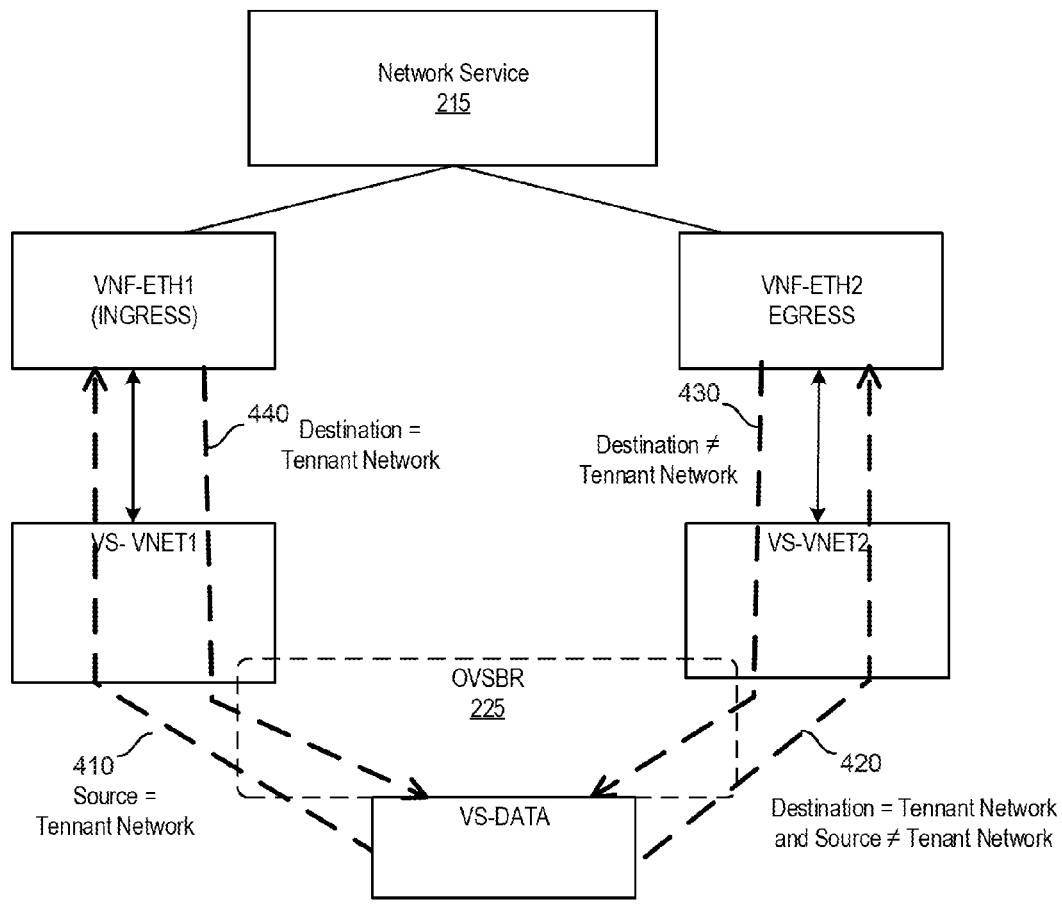
FIG. 4B is an enlarged view of a portion of FIG. 2 illustrating the flows of FIG. 4A.

FIG. 4A illustrates one method for routing flows in accordance with the present technology when using a virtual switch. FIG. 4B graphically illustrates the flows of FIG. 4A relative to an enlarged view of a portion of FIG. 2. In the description of FIGS. 4A and 4B, the terms "source" network and "tenant" network are merely illustrative, and each may include any one or more network address ranges and/or subnets, or any delineation of network addressable processing elements.

With respect to FIG. 4A, the ordering of steps 410, 420, 430 and 440 is illustrative only, such that steps 410, 420, 430 and 440 may be performed in any order. At 410, for any packet at the virtual data port of the outer virtual machine (VS-DATA) with source address of the tenant network, forward the packet to ingress interface (VS-VNET1 in the above example). At 420, for any packet at the virtual data port of outer virtual machine (VS-DATA) having a network destination address of a tenant network and a source address not equal to tenant network, send to egress network interface VS-VNET2 (which will be routed to ETH1). At 430, for any packet at the egress VNF interface (VNF-ETH2) with a network destination not equal to tenant network, forward to virtual data port of outer virtual machine (VS-DATA) (routed to ETH1). At 440, for any packet from ingress VNF interface (VNF-ETH1) with network destination on the tenant network, forward to the virtual data port of the outer virtual machine (VS-DATA). At 450, all other packets not meeting the above criteria are dropped.

FIG. 4B graphically illustrates the flows of FIG. 4A relative to an enlarged view of a portion of FIG. 2. In FIG. 4B, traffic flow of a packet from ingress VNF interface (VNF-ETH1) with a network destination on the tenant network and forwarded to the virtual data port of the outer virtual machine (VS-DATA) is illustrated at 440a. Traffic flow of a packet at the egress VNF interface (VNF-ETH2) with a network destination not equal to tenant network which is forwarded to virtual data port of outer virtual machine (VS-DATA) is illustrated at 430a. A packet moving from the virtual data port of outer virtual machine (VS-DATA) having a network destination address of a tenant network and a source address not equal to tenant network, and forwarded to egress network interface VS-VNET2 is illustrated at 420a. A packet at the virtual data port of the outer virtual machine (VS-DATA) with source address of the tenant network and which is forwards the packet to ingress interface (VS-VNET1) is illustrated at 410a. Where additional VNF interfaces are present, packets may be routed between each VNF interface and the virtual switch interfaces based on various flow definitions such as IP addresses, MAC addresses, packet data type, network protocol, or traffic classification.

The flows illustrated in FIGS. 4A and 4B are merely exemplary and illustrate an implementation of the technology using a two-interface VNF. For other VNFs having two or more ports, any number of different flows may be utilized in accordance with any requirements of the VNF. In such cases, alternate flow definitions may be used. For example, flows may be specified with greater granularity, or based on different constraints, such as virtual mac addresses, protocols or time to live parameters. For example, in a two interface VNF where flows comprise packets of different protocols (such as UDP and TCP), one flow (UDP) may be directed to VNF-ETH1 and another (TCP) to VNF-ETH2. In another example where three network interfaces are provided, one flow may direct all packets having a time to live (TTL) of a given value to one interface, all UDP packets to a second interface, and all packets having a specific virtual LAN (VLAN) tag to a third network interface.

Figure 5:
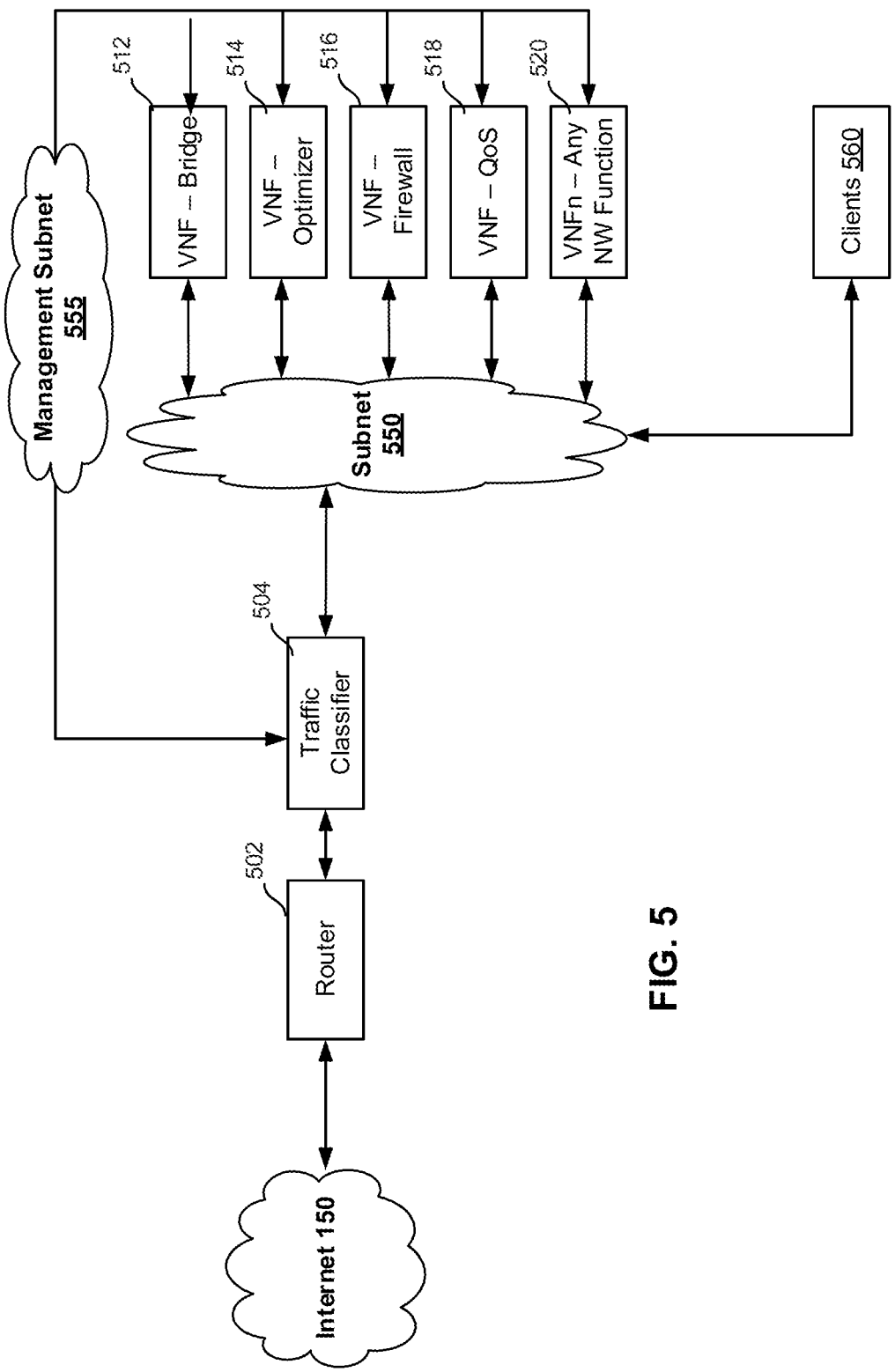
FIG. 5 is a block diagram illustrating VNF devices each having a single network interface.

FIG. 5 illustrates a service management configuration utilizing a single network interface series of VNFs. Each of the VNFs 512, 514, 516, 518, and 520 are implemented in a manner similar that of FIG. 2. FIG. 5 illustrates a bridge VNF 512, a video optimizer VNF 514, a firewall VNF 516, a quality of service (QoS) VNF 516 and a VNFn representing any virtual network function which may be implemented in a service chain. Each of the VNFs 512-520 is connect to a first subnet 550 having a first subnet mask using a bidirectional data port such as VS-DATA of FIG. 2. Any number of subnet clients 560 may connect to subnet 550. VNFs coupled to the first subnet are managed by a traffic classifier 504 which connects to each of the VNFs 512-520 through a management subnet 555. Traffic from any of the clients 560 can be routed by the traffic classifier 504 to any of the VNFs 512-520 and further through router 502 to the internet 150. In the topology of FIG. 5, each VNFs utilizes a single, bidirectional interface (i.e. VS-DATA) for data input and output to subnet 550, and a single network interface (i.e. VS-MGMT) for configuration data on management subnet 555. In the exemplary topology of FIG. 5, traffic flow on the subnet 550 may be routed into and out of each of the VNFs 512-520 by the traffic classifier depending on the services to be provided for each type of traffic on the subnet 550, with traffic entering and exiting the subnet 555 through router 502.

Figure 6:
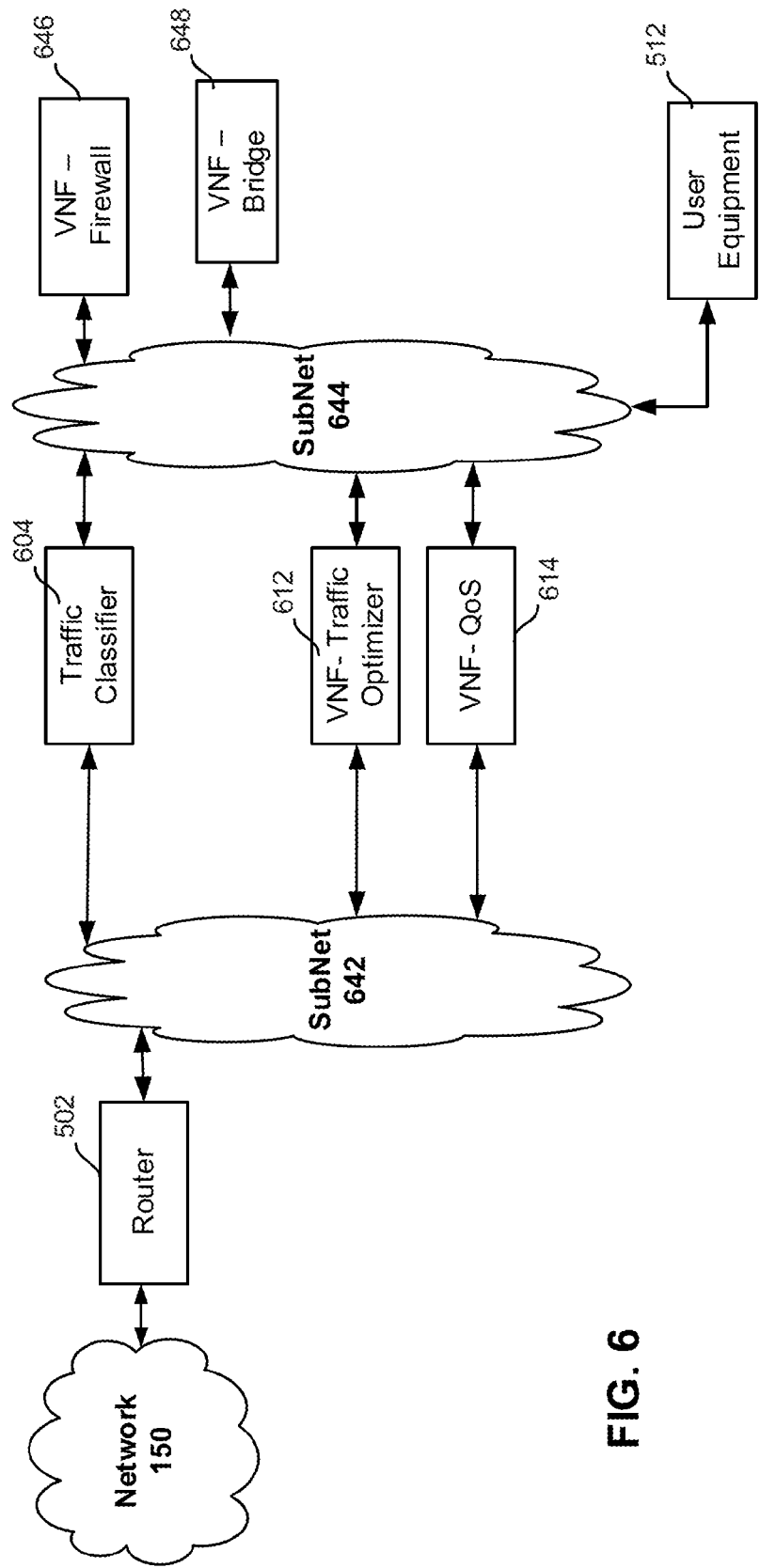
FIG. 6 is a block diagram illustrating a combination of VNF devices having both multiple network interfaces and single network interfaces in combination.

FIG. 6 illustrates a service management configuration utilizing a combination of single network interface VNFs and multi-network interface VNFs. (For simplicity, a management subnet is not illustrated but a management subnet such as management subnet 555 illustrated with respect to FIG. 5 may be coupled to the traffic classifier 604 and each of the VNFs. FIG. 6 illustrates two data subnets 642, 644. Two VNFs, a traffic optimizer 612 and QoS system 614 have one network interface connected to subnet 642 and another network interface connected to subnet 644. The particular arrangement of VNFs using single or multiple interfaces is exemplary only. VNFs 646 and 648 are single data port VNFs implemented in accordance with the architecture of FIG. 2. A traffic classifier 604 manages traffic from clients 512 through any of the various VNFs to provide service chaining across the multiple subnets and multiple devices. In this example, the traffic classifier 604 has a first interface coupled to subnet 642 and a second interface coupled to subnet 644 such that it can classify traffic for each of the VNFs 612, 614, 646, 648 and route traffic on either subnet. FIG. 6 illustrates one embodiment where multiple interface VNFs 612, 614 may be utilized with single interface VNFs 646, 648. In this example, traffic to and from user equipment 512 may be routed to VNF firewall 646 or VNF bridge 648 depending on traffic source (i.e. certain clients or traffic are firewalled while others are not) to protect user equipment 512. Other traffic types, such as video traffic, may require optimization and performance of the traffic optimizer VNF 612 may be improved by not nesting the optimizer VNF within an outer VNF as in the example of FIG. 2.

Figure 7:
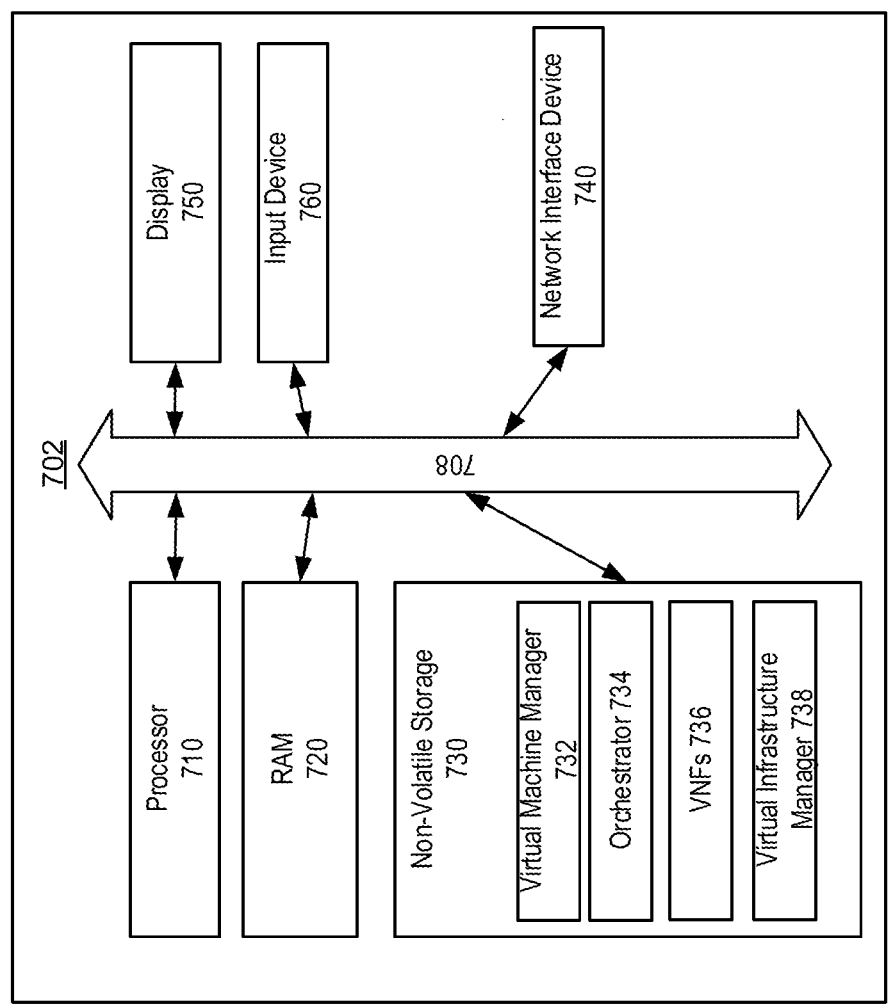
FIG. 7 is a block diagram of a processing device suitable for implementing the technology.

FIG. 7 is a computing system suitable for use in implementing the present technology. The computing system 702 may include, for example, a microprocessor 710, random access memory (RAM) 720, nonvolatile storage 730, a display 750, an input device 760, and a network interface device 740. In certain embodiments, the computing system 702 may be embedded into a personal computer, mobile computer, mobile phone, tablet, or other suitable processing device.

Illustrated in non-volatile storage 730 are functional components which may be implemented by instructions operable to cause processor 710 to implement one or more of the processes described below. While illustrated as part of non-volatile storage 730, such instructions may be operate to cause the processor to perform various processes described herein using any one or more of the hardware components illustrated in FIG. 7. These functional components include a virtual machine manager and a VNF.

Non-volatile storage 730 may comprise any combination of one or more computer readable media. The computer readable media may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a computer diskette, a hard disk, a random access memory (RAM), a read-only memory (ROM), an erasable programmable read-only memory (EPROM or Flash memory), an appropriate optical fiber with a repeater, a compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The computer system 702 can include a set of instructions that can be executed to cause computer 702 to perform any one or more of the methods or computer based functions disclosed herein. Computer program code for carrying out operations for aspects of the present disclosure may be written in any combination of one or more programming languages, including an object oriented programming language conventional procedural programming languages. The program code may execute entirely on the computer 702, partly on the computer system 702, as a stand-alone software package, partly on the computer system 702 and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

As illustrated in FIG. 7, the computing system 702 includes a processor 710. A processor 710 for computing system 702 is configured to execute software instructions in order to perform functions as described in the various embodiments herein. A processor 710 for a computing system 702 may be a general purpose processor or may be part of an application specific integrated circuit (ASIC). A processor 710 for a computing system 702 may also be a microprocessor, a microcomputer, a processor chip, a controller, a microcontroller, a digital signal processor (DSP), a state machine, or a programmable logic device. A processor 710 for a computing system 702 may also be a logical circuit, including a programmable gate array (PGA) such as a field programmable gate array (FPGA), or another type of circuit that includes discrete gate and/or transistor logic. A processor 710 for a computing system 702 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computing system 702 includes a RAM 720 and a non-volatile storage 730 that can communicate with each, and processor 710, other via a bus 708. Illustrated in the non-volatile storage 730 are components including a virtual machine manger 732 which may be utilized by the processor to create the virtualization layer 145 of FIG. 1, an orchestrator 734 which may be utilized by the processor to create the orchestrator 132 of FIG. 1, virtual network functions 736 which are utilized create any of the virtual network functions described herein, and a virtual infrastructure manager 738 which is utilized to create the virtual infrastructure manager 136 of FIG. 1 as well as any of the virtual machines described herein.

As shown, the computing system 702 may further include a display unit 750, such as a liquid crystal display (LCD), an organic light emitting diode (OLED), a flat panel display, a solid state display, or a cathode ray tube (CRT). Additionally, the imaging processor may include an input device 760, such as a keyboard/virtual keyboard or touch-sensitive input screen or speech input with speech recognition, and which may include a cursor control device, such as a mouse or touch-sensitive input screen or pad.

Memories described herein are tangible storage mediums that can store data and executable instructions, and are non-transitory during the time instructions are stored therein. A memory described herein is an article of manufacture and/or machine component. Memories will described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The technology advantageously provides an outer virtual machine in conjunction with the inner virtual machine to provide a virtual network function abstraction layer, allowing any number of network interfaces required by a VNF to be addressable via a single network interface in the outer virtual machine. As such, virtual network function requirements are abstracted from the orchestrator and the virtual network infrastructure, and orchestration of service chaining systems may be implemented by any of a number of different orchestrators. The technology greatly simplifies service delivery network orchestration, and allows a wider variety of commercial or public VNFs to be used with various orchestrators which would otherwise not be able to easily implement the VNFs in service delivery networks.

In accordance with the above advantages, the technology includes a means for providing a virtual network function (202) within a first virtual machine (210), the means for providing a virtual network function including multiple data interfaces (VNF-ETH1, VNF-ETH2). A means for providing a second virtual machine (250) nests the first virtual machine therein. A means for directing data (212) between a single bidirectional network interface (VS-DATA) in the second virtual machine (250) and the multiple data interfaces is also provided. The means for directing data includes at least a first virtual data network interface means (VS-VNET1) and a second virtual data network interface means (VS-VNET-2) communicating with the multiple data interfaces.

In another aspect, the technology provides a means for applying network services to network traffic in a first virtual operating environment, the means for applying having multiple data interfaces. A means for routing data between a single network interface in a second virtual operating environment in which the first virtual operating environment is nested is also provided. The second virtual operating environment includes means for routing data between the single network interface and the multiple data interfaces. The means for routing may include means for interfacing with the multiple network interfaces, the means routing data between the single network interface and the means for interfacing, and the means for interfacing directing data to and from the multiple data interfaces.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A processor implemented method providing a network service in a processing system, comprising:
   creating a first virtual machine in the processing system which includes a first virtual switch, the first virtual machine includes a single virtual bidirectional data network interface, the single virtual bidirectional data network interface receives network data and transmits network data, the first virtual switch includes a first virtual data network interface and a second virtual data network interface;
   creating a second virtual machine, the second virtual machine operates and is nested within the first virtual machine in the processing system, the second virtual machine includes a virtual network function (VNF), the second virtual machine includes a first VNF data interface and a second VNF data interface; and
   routing data between the single virtual bidirectional data network interface, the first virtual data network interface and second virtual data network interface, the routing directs inbound and outbound network data to the virtual network function via the first VNF data interface and the second VNF data interface, and the first virtual data network interface and the second virtual data network interface,
   wherein the single virtual bidirectional data network interface is operable on an infrastructure interface, the infrastructure interface is responsive to an orchestrator, the orchestrator allows the single virtual bidirectional data network interface on a first subnet of the infrastructure interface, the infrastructure interface coupled to the single virtual bidirectional data network interface.

2. The method of claim 1 wherein the single virtual bidirectional data network interface receives network data from client processing devices on a subnet, the virtual network function outputs the network data to a second network.

3. The method of claim 2 wherein the single virtual bidirectional data network interface receives and transmits data for the virtual network function, the first VNF data interface communicates with the first virtual data network interface, the second VNF data interface communicates with the second virtual data network interface, and the single virtual bidirectional data network interface communicates with the first virtual data network interface and the second virtual data network interface.

4. The method of claim 1 wherein the routing including routing network data between a first network and a second network, the routing comprises:
   for a packet from the single virtual bidirectional data network interface having a source address from the first network, routing the packet to the first virtual data network interface;
   for a packet from the single virtual bidirectional data network interface addressed to the first network, forward to the second virtual data network interface;
   for a packet from the second virtual data network interface addressed to the second network, forward to the single virtual bidirectional network interface; and
   for a packet from the first virtual data network interface addressed to the first network, forward to the single virtual bidirectional data network interface.

5. The method of claim 1 wherein the virtual network function comprises a firewall service, the firewall service operates in bridge mode, the data network interface receives network data from a single subnet.

6. The method of claim 1 wherein the single virtual bidirectional data network interface is coupled to an infrastructure interface, the infrastructure interface comprises a virtual machine.

7. The method of claim 1 further including
   configuring a management network interface and a virtual management network interface in the first virtual machine, creating a VNF management interface in the second virtual machine, the management network interface communicates with an orchestrator, and routing management commands from the orchestrator from the management network interface to the virtual management network interface.

8. A non-transitory computer readable medium storing instructions for providing a virtual network function utilizing multiple data interfaces for electronic network data via a single network data interface, that when executed by one or more processors, cause the one or more processors to perform the steps of:

creating a first virtual machine;

creating a first virtual switch in the first virtual machine, the first virtual switch includes the single data network interface which receives network data from and outputs network data to an infrastructure network interface, the first virtual switch includes a first virtual data network interface and a second virtual data network interface;

creating a virtual network function, the virtual network function operable within a second virtual machine, the second virtual machine operable within the first virtual machine, the virtual network function includes a first VNF data interface and a second VNF data interface, the first VNF data interface and the second VNF data interface communicate with the first virtual data network interface and second virtual data network interface; and routing data flows between the data network interface of the first virtual switch, and the first virtual data network interface and second virtual data network interface, and directing inbound and outbound network data flow between data on the infrastructure network interface and the virtual network function, wherein the data network interface is operable on an infrastructure, the infrastructure is responsive to an orchestrator, the orchestrator allows network interfaces for virtual network functions on a subnet to be addressed within a subnet mask, the infrastructure coupled to the data network interface.

9. The non-transitory computer readable medium of claim 8 wherein the infrastructure network interface comprises a virtual interface of a virtual machine, the virtual machine including an infrastructure virtual switch.

10. The non-transitory computer readable medium of claim 8 wherein the routing data flows includes routing network data between a first network and a second network.

11. The non-transitory computer readable medium of claim 8 wherein the infrastructure network interface comprises a network interface of a host processing system.

12. The non-transitory computer readable medium of claim 8 the one or more processors further performing the steps of creating a management network interface and a virtual management network interface in the first virtual machine, creating a VNF management interface in the second virtual machine, the management network interface communicates with an orchestrator, and routing data flows routes management commands from the orchestrator from the management network interface to the virtual management network interface.

13. A service delivery network, comprising:

a processing system including at least a processor, storage operably coupled to the processor, and a network interface;

a plurality of virtual network function systems in the processing system, each virtual network function system including instructions to instruct the processor to create the virtual network function system as coupled to the network interface, the instructions instruct the processor to create a first virtual machine;

provide a first virtual switch within the first virtual machine, the first virtual switch includes a single data network interface interfacing with the network interface, the first virtual switch includes a first virtual data network interface and a second virtual data network interface;

create a second virtual machine within the first virtual machine;

create a virtual network function operable in the second virtual machine, the virtual network function includes a first VNF data interface and a second VNF data interface; and manage data flows between the single data network interface, the first virtual data network interface and second virtual data network interface, the data flows include inbound and outbound network data directed to the virtual network function, wherein the network interface is operable on an infrastructure interface, the infrastructure interface is responsive to an orchestrator, the orchestrator allows a single virtual bidirectional interface on a first subnet of the infrastructure interface, the infrastructure interface coupled to the single virtual bidirectional network interface.

14. The service delivery network of claim 13 wherein the single data network interface is operable on an infrastructure, the infrastructure is responsive to an orchestrator, the orchestrator allows network interfaces for virtual network functions on a subnet to be addressed within a subnet mask, an infrastructure interface is coupled to the single data network interface.

15. The service delivery network of claim 14 wherein at least one of the plurality of virtual network functions utilizes two network interfaces having addresses in different subnets masks, and wherein each of the two network interfaces is addressable using the single data network interface.

16. The service delivery network of claim 13 wherein the single data network interface receives network data from client processing devices on a single subnet, the virtual network function outputs the network data to a second network outside a subnet mask of the single subnet.

17. The service delivery network of claim 13 further including instructions to create a management network interface and a virtual management network interface in the first virtual machine, create a VNF management interface in the second virtual machine, the management network interface communicates with an orchestrator, and wherein the instructions include code to receive management commands from the orchestrator from the management network interface to the virtual management network interface.

* * * * *